April 3, 1956  M. F. H. GOUVERNEUR II  2,740,315
THREAD CUTTING SCREW WITH FRANGIBLE SHANK
Filed March 3, 1953
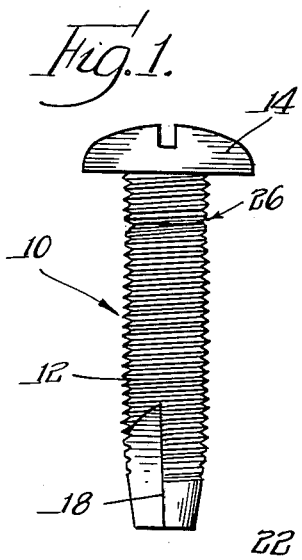
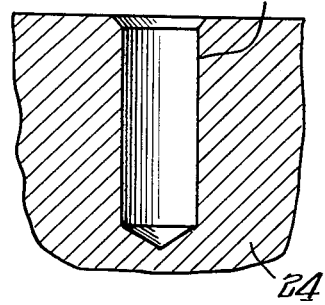
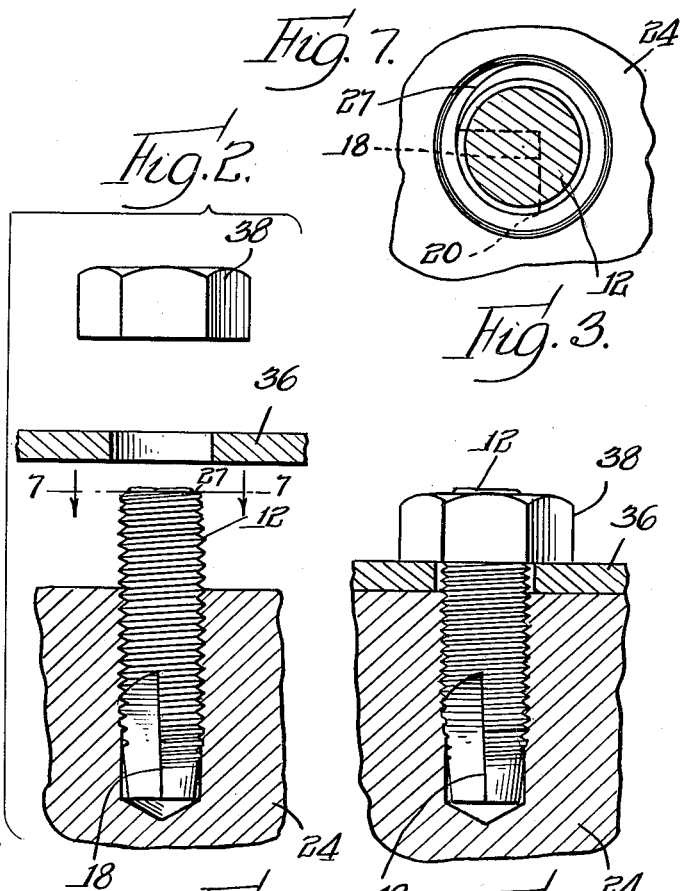
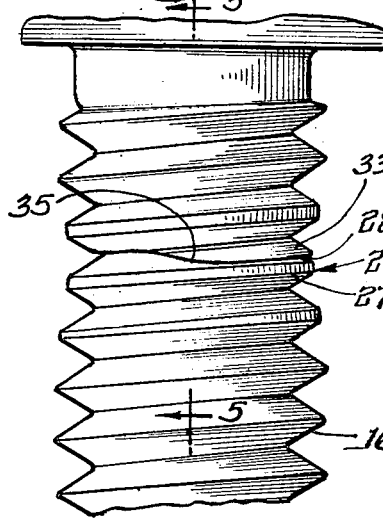
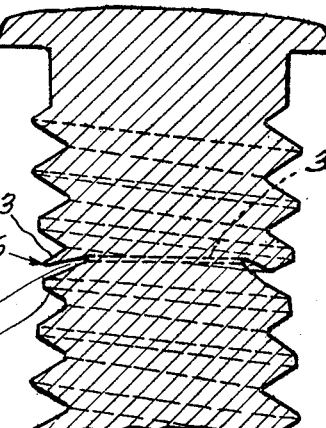
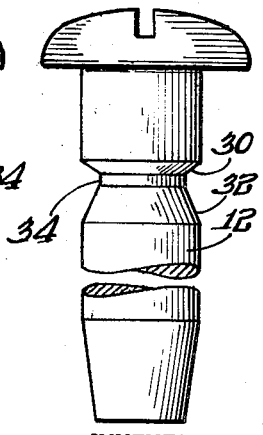
INVENTOR.
Minor F. H. Gouverneur II
BY
Moore, Olson & Trexler
attys.

United States Patent Office 2,740,315
Patented Apr. 3, 1956

2,740,315

THREAD CUTTING SCREW WITH FRANGIBLE SHANK

Minor F. H. Gouverneur II, Wheaton, Ill., assignor to Illinois Tool Works, Chicago, Ill., a corporation of Illinois Application March 3, 1953, Serial No. 340,109

1 Claim. (Cl. 85—47)

The present invention relates to a novel thread cutting screw of the type adapted to be driven into a blind unthreaded hole in a workpiece.

The present invention contemplates a novel thread cutting screw which is particularly adapted to be threaded into a blind hole in a workpiece and then ruptured or sheared to provide a stud for receiving a complementary threaded fastener such as a nut. By providing such a screw with an integral head, the screw may be threaded into the blind hole without necessity for providing a special tool and without injuring the threads. After the screw has been threaded into the hole the desired amount, the screw head is broken off so that the screw then becomes a stud adapted to receive a nut or the like. However, care must be taken to insure that the shank of the screw ruptures at the desired point and that the threads at the ruptured end of the shank are suitable for receiving the nut.

It is a primary object of the present invention to provide a novel thread cutting screw of the above described type which is constructed in a manner to insure rupture of the screw shank at a desired point.

Another object of the present invention is to provide a novel thread cutting screw of the above described type which is constructed in a manner so that the threads at the ruptured end of the screw will readily receive a complementary rotary fastener such as a nut.

It is still another object of the present invention to provide a novel thread cutting screw of the above described type wherein the shank is weakened at a predetermined point to insure rupture at said point but only after the screw has been completely threaded within a blind hole in a workpiece.

Other objects and advantages of the present invention will become apparent from the following description and the accompanying drawings wherein:

Fig. 1 is an elevational view partially in cross section showing a screw embodying the novel features of this invention positioned for insertion within a blind unthreaded aperture in a workpiece;

Fig. 2 is an exploded elevational view showing the novel screw of this invention after the head has been sheared and in position to receive an apertured workpiece and a fastening nut;

Fig. 3 is a side elevational view partially in cross section showing the parts of Fig. 2 in their finally assembled relationship;

Fig. 4 is an enlarged side elevational view showing the novel features of this invention in greater detail;

Fig. 5 is a cross sectional view taken along line 5—5 in Fig. 4;

Fig. 6 is a fragmentary side elevational view showing a screw blank from which the novel screw of this invention is formed; and Fig. 7 is a horizontal cross sectional view taken along line 7—7 of Fig. 2.

Referring now more specifically to the drawings wherein like parts are designated by the same numerals throughout the various figures, a novel thread cutting screw embodying the principles of this invention is shown best in Figs. 1 and 4. The screw 10 includes a shank 12 and a head 14.

The shank 12 is provided with continuous helical threads 16 which may be formed thereon in any suitable manner such as by rolling. Preferably the threads are formed along substantially the entire length of the shank. The free end of the shank is provided with a generally axially extending recess partially defined by a wall 18 which is preferably disposed at a slight angle to the longitudinal axis of the shank. The juncture between this wall 18 and the threads at the free end of the shank provide a thread cutting edge 20 for cutting threads into the surface of the bore 22 in the workpiece 24. The recess in the shank is preferably of sufficient size to accommodate the chips cut from the workpiece 24 during the threading operation. The threads 16 adjacent the free end of the shank 12 and intersected by the wall 18 are preferably of successively decreasing heights whereby to facilitate insertion of the screw into the aperture 22.

In accordance with a novel feature of the present invention, at least one convolution 26 of the helical threads 16 is formed having a slightly decreased height with respect to the remaining thread convolutions. This thread convolution 26 may be positioned at any desired point along the length of the shank, but is preferably positioned adjacent the screw head 14. In order to weaken the shank of the screw to insure rupture at the desired point for the purpose set forth hereinabove, a narrow annular slot 28 is provided, which slot extends through the convolution 26 and into the body of the shank so as to provide a point of reduced diameter. It should be noted that this slot is disposed so that the bottom thereof lies in a plane extending generally perpendicularly to the longitudinal axis of the screw shank as shown best by the dotted lines in Fig. 5. Thus, upon rupture, the portion 27 of the thread convolution 26 remaining with the shank 12 is of gradually decreasing height so as to facilitate the reception of a threaded nut.

In Fig. 6 one method of forming the novel screw of this invention is illustrated. The unthreaded shank 12 is provided with a groove having tapering sides 30 and 32 and a bottom 34 having a diameter less than the root diameter of the threads to be formed. The screw blank formed in this manner is then acted upon by a thread forming machine, with the result that the groove walls 30 and 32 are rolled to provide thread portions 27 and 33 and form the above mentioned thread convolution 26 having the narrow slot 28 extending therethrough. During the thread rolling operation the thread portions 27 and 33 are shaped and forced together so that the slot 28 is substantially closed and the thread portions overlap as at 35 whereby the thread convolution 26 thus formed is suitable for receiving a threaded nut if desired. In the drawing and particularly Fig. 5 the width of the slot 28 has been somewhat exaggerated for the purpose of better illustration but it will be understood that normally the thread portions 27 and 33 will be pressed together so that the slot 28 is substantially closed. By adjusting the angle of inclination of the groove walls, the height or outer diameter of the thread convolution 26 may be adjusted as desired. Furthermore, by extending the inclined wall 32 of the groove along a greater axial distance of the screw shank the diameter of the thread convolutions immediately adjacent the convolution 26 may be decreased to further facilitate the application of a threaded nut to the ruptured screw shank. As shown best in Figs. 4 and 5, the preferred embodiment illustrated has been formed so that the thread convolution immediately adjacent the convolution 26 have a reduced height.

The operation of the novel screw of this invention is believed to be self evident but a brief description of the operation is as follows. The screw is inserted into a blind aperture 22 and a torque is applied to the head 14 in any conventional manner to thread the screw into the aperture. After the screw engages the bottom of the aperture an increased torque is applied to the screw head which causes the screw shank to rupture or shear at the weakened area provided by the slot 28. Any desired apertured workpiece 36 is then placed over the screw shank and a suitable rotary fastener such as nut 38 is threaded onto the sheared end of the screw shank as shown in Figs. 2 and 3. It is, of course, understood that the reduced diameter portion of the screw shank created by the slot 28 should have sufficient strength to withstand the torque necessarily applied to the head 14 as the screw is threaded into unthreaded bore 22.

From the above description it is seen that the invention has provided a novel thread cutting screw which may be easily and quickly threaded into a blind unthreaded aperture in a workpiece and which may be sheared or ruptured to provide a stud for receiving a fastener such as a nut. In addition, by reason of the novel construction of the screw of this invention, the ruptured end of the screw shank is provided with clean undamaged threads of progressively decreasing diameter for ready reception of a fastening nut or the like.

While the preferred embodiment of the present invention has been illustrated and described herein, it is obvious that many changes may be made in the structural details without departing from the spirit and scope of the appended claim.

I claim:

A thread cutting screw comprising a threaded shank and an enlarged head at one extremity thereof having means to facilitate drivingly rotating said screw into a complementary aperture of a workpiece, the thread convolutions toward the entering end of the screw diminishing in external diameter to present a tapered entering screw extremity to facilitate initial entrance of the screw into a work aperture, the entering extremity of the screw shank being slotted transversely of the thread convolutions in that vicinity to provide a cutting edge, a substantially annular groove spaced axially from the slot in the tapered thread cutting end of the screw toward the head thereof, said groove extending to a depth below the normal root diameter of the screw threads so as to provide a predetermined point of weakness in the form of a fracturable shank section, the strength of the screw material in said weakened shank section being sufficient to withstand without fracture the turning torque required to cause the cutting edge at the entering end of the screw to form an internal thread in a complementary workpiece, the strength of said weakened shank section being insufficient to withstand fracture as an incident to turning torque applied to the screw after the entering end thereof has bottomed within the work aperture, said annular groove being defined by an annular surface on the side disposed toward the entering end of the screw presenting a terminating portion of a thread convolution which diminishes in height toward the fractured end of the screw whereby to facilitate subsequent application of a fastener member such as an internally threaded nut to that portion of the fractured screw projecting beyond the work aperture.

References Cited in the file of this patent

UNITED STATES PATENTS

| | | |
|---|---|---|
| 1,039,576 | Mueller et al. | Sept. 24, 1912 |
| 2,128,757 | Olson | Aug. 30, 1938 |
| 2,247,499 | Hutchison | July 1, 1941 |
| 2,255,997 | Hanneman | Sept. 16, 1941 |
| 2,289,785 | Hutchison | July 14, 1942 |